(12) United States Patent
Swar et al.

(10) Patent No.: US 11,129,220 B2
(45) Date of Patent: Sep. 21, 2021

(54) VEHICLE COMMUNICATION VIA MULTIPLE WIRELESS COMMUNICATION LINKS

(71) Applicant: Westinghouse Air Brake Technologies Corporation, Wilmerding, PA (US)

(72) Inventors: Padam Dhoj Swar, Clarksburg, MD (US); Carl L. Haas, Walkersville, MD (US); Danial Rice, Frederick, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 279 days.

(21) Appl. No.: 16/235,144

(22) Filed: Dec. 28, 2018

(65) Prior Publication Data

US 2020/0214062 A1 Jul. 2, 2020

(51) Int. Cl.
*H04W 76/15* (2018.01)
*H04W 4/42* (2018.01)
(Continued)

(52) U.S. Cl.
CPC ............ *H04W 76/15* (2018.02); *H04W 4/42* (2018.02); *H04W 24/04* (2013.01); *H04W 28/04* (2013.01);
(Continued)

(58) Field of Classification Search
CPC ......... H04W 4/40; H04W 4/42; H04W 76/28; H04W 84/005; H04W 12/10; H04W 24/04; H04W 28/04; H04W 4/02; H04W 52/0229; H04W 52/028; H04W 76/14; H04W 76/15; H04W 76/23; H04W 92/18;
(Continued)

(56) References Cited

U.S. PATENT DOCUMENTS 6,862,502 B2 3/2005 Peltz et al.
8,825,239 B2 9/2014 Cooper et al.
(Continued)

OTHER PUBLICATIONS

Wikipedia, "BCH code", https://en.wikipedia.org/w/inde.php?title=BCH_code&oldid=872137712, Printed Mar. 4, 2019.
(Continued)

*Primary Examiner* — Philip Sobutka
(74) *Attorney, Agent, or Firm* — Christopher R. Carroll; The Small Patent Law Group LLC (57) ABSTRACT

A method of communication between first and second controllers positioned in spaced relation along a length of a train includes forming between the first and second controllers, first and second wireless communication channels operating at different carrier frequencies and causing the first and second wireless communication channels to be in communication in parallel, whereupon the first and second controllers are in communication via both the first and second wireless communication channels. The first controller then causes information to be transmitted in parallel on the first and second wireless communication channels to the second controller and the second controller receives the information transmitted in parallel on first and second wireless communication channels. The first and second wireless communication channels are then caused to be inactive, whereupon the first and second controllers are out of communication.

20 Claims, 6 Drawing Sheets

(51) Int. Cl.
*H04W 76/28* (2018.01)
*H04B 1/40* (2015.01)
*H04W 24/04* (2009.01)
*H04W 76/23* (2018.01)
*H04W 28/04* (2009.01)
*H04W 76/14* (2018.01)
*H04W 92/18* (2009.01)

(52) U.S. Cl.
CPC .......... *H04W 76/14* (2018.02); *H04W 76/23* (2018.02); *H04W 76/28* (2018.02); *H04W 92/18* (2013.01)

(58) Field of Classification Search
CPC ............. B61L 15/0018; B61L 15/0027; B61L 15/0054; B61L 15/0072; B61L 2205/02; B61L 3/125; B61L 3/20; B61L 3/227; H04L 67/12; Y02D 30/70
USPC ............... 455/3.06, 39, 41.2, 500, 517, 90.1
See application file for complete search history.

(56) References Cited

U.S. PATENT DOCUMENTS

| | | |
|---|---|---|
| 9,637,147 B2 | 5/2017 | Golden et al. |
| 10,065,665 B2 | 9/2018 | Cooper et al. |
| 2010/0130124 A1* | 5/2010 | Teeter ................. B61L 15/0027 455/15 |
| 2012/0123617 A1 | 5/2012 | Noffsinger et al. |
| 2013/0095883 A1* | 4/2013 | Hirsch .............. H04W 52/0229 455/553.1 |
| 2013/0151032 A1* | 6/2013 | Kraeling ................. H04L 67/12 701/1 |
| 2015/0045993 A1 | 2/2015 | Cooper et al. |
| 2016/0194014 A1 | 7/2016 | Rajendran |

OTHER PUBLICATIONS

Wikipedia, "Cellular frequencies in the US", https://en.wikipedia.org/wiki/Cellular_frequencies_in_the_US, Printed Mar. 4, 2019.

Wikipedia, "Cyclic redundancy check", https://en.wikipedia.org/w/inde.php?title=Cyclic_rudundancy_check&oldid=872223228, Printed Mar. 4, 2019.

Wikipedia, "Sleep mode", https://en/wikipedia.org/wiki/Sleep_mode, Printed Mar. 4, 2019.

wpsantennas.com, "Cellular Antennas, Amplifiers and Repeaters are Frequency Specific", http://www.wpsantennas.com/cellular-freuency-information/aspx, Printed Mar. 4, 2019.

Franssens, "Impact of multiple inquirers on the Bluetooth discovery process and its application to localization", University of Twente. (91 pages).

* cited by examiner

VEHICLE COMMUNICATION VIA MULTIPLE WIRELESS COMMUNICATION LINKS

BACKGROUND OF THE INVENTION

Field of the Invention

The present invention relates to wireless communications between devices positioned in spaced relation along the length of a train and, more particularly, to communication over multiple wireless communication channels.

Description of Related Art

Existing head of train (HOT) and end of train (EOT) devices utilize a single wireless communication channel or link and, therefore, does not have redundancy when a train is passing through a challenging RF environment. Current practices and regulations allow for long periods of time without communication between the HOT and EOT, e.g., up to approximately 16.5 minutes. This can be potentially an unsafe situation, especially if emergency braking is needed when there is no communication.

SUMMARY OF THE INVENTION

Generally, provided, in some non-limiting embodiments or examples is a method of communicating between first and second controllers e.g., an HOT and an EOT, of a train.

Further preferred and non-limiting embodiments or examples are set forth in the following numbered clauses.

Clause 1: A method of communication between a head-of-train (HOT) device positioned at or proximate a front of a train and an end-of-train (EOT) device positioned at or proximate a rear of the train, the method comprising: (a) providing, between the HOT and the EOT, a plurality of wireless communication channels, each wireless communication channel operating at a different radio carrier frequency than each other wireless communication channel; (b) causing the plural wireless communication channels to be active and in communication in parallel; (c) following step (b), transmitting, by one of the HOT or EOT, information in parallel on the plural wireless communication channels; (d) following step (c), receiving, by the other of the HOT or EOT, the information transmitted in parallel on the plural wireless communication channels; and (e) following step (d), causing the plural wireless communication channels to be inactive and out of communication.

Clause 2: The method of clause 1, further including (f) repeating steps (b)-(e).

Clause 3: The method of clause 1 or 2, further including (f) repeating steps (b)-(e) intermittently.

Clause 4: The method any one of clauses 1-3, wherein step (d) includes: determining, by the other of the HOT or EOT, data integrity of the information transmitted on each wireless communication channel; and in response to the determining that that the data integrity for the plurality of wireless communication channels is the same, the other of the HOT or EOT storing or responding to said information.

Clause 5: The method any one of clauses 1-4, wherein determining data integrity includes determining one of the following: a checksum; a Bose-Chaudhuri-Hocquenghem (BCH) code; or a cyclic redundancy check (CRC).

Clause 6: The method any one of clauses 1-5, where the information comprises digital data that is modulated on each radio carrier frequency.

Clause 7: A method of communication between a head-of-train (HOT) device positioned at or proximate a first end of a train and an end-of-train (EOT) device positioned at or proximate a second end of a train, the method comprising: (a) providing, between the HOT and the EOT, first and second wireless communication channels, the first wireless communication channel operating at a first frequency band and the second wireless communication channel operating at a second, different frequency band; (b) causing the first and second wireless communication channels to be in communication in parallel, whereupon the HOT and EOT are in communication via both the first and second wireless communication channels; (c) following step (b), causing, by one of the HOT or EOT, information to be transmitted in parallel on the first and second wireless communication channels; (d) following step (c), receiving, by the other of the HOT or EOT, the information transmitted in parallel on first and second wireless communication channels; and (e) following step (d), causing the first and second wireless communication channels to be inactive, whereupon the HOT and EOT are out of communication.

Clause 8: The method of clause 7, wherein: the HOT includes at least one HOT radio transceiver; the EOT includes at least one EOT radio transceiver; and step (e) includes the at least one HOT radio transceiver and the at least one EOT radio transceiver entering into a low power, stand-by or sleep mode, whereupon the first and second wireless communication channels are inactive.

Clause 9: The method of clause 7 or 8, wherein: step (b) includes, one of the EOT and HOT radio transceivers awakening from the low power, stand-by or sleep mode into its active, fully operational mode and initiating communication with the other of the EOT and HOT radio transceivers via at least one of the first and second wireless communication channels whereupon the other of the EOT and HOT radio transceivers awakes from its low power, stand-by or sleep mode into its active, fully operational mode, whereupon the EOT and HOT radio transceivers form the first and second wireless communication channels.

Clause 10: The method any one of clauses 7-9, further including (f) repeating steps (b)-(e).

Clause 11: The method of any one of clauses 7-10, further including (f) repeating steps (b)-(e) intermittently.

Clause 12: The method of any one of clauses 7-11, wherein step (d) includes: determining a first checksum of the information transmitted on the first wireless communication channel and a second checksum of the information transmitted on the second wireless communication channel; and in response to determining that the first and second checksums are the same storing or responding to said information.

Clause 13: The method of any one of clauses 7-12, wherein step (d) includes: determining a first checksum of the information transmitted on the first wireless communication channel and a second checksum of the information transmitted on the second wireless communication channel; and in response to determining (1) the first checksum is not equal to a reference checksum included in the information transmitted on at least one the first and second wireless communication channels and (2) the second checksum is equal to the reference checksum, storing or responding only to said information transmitted on the second wireless communication channel.

Clause 14: The method of any one of clauses 7-13, wherein responding to said information includes: the other of the HOT or EOT transmitting second information in parallel on the first and second wireless communication channels; and the one of the HOT or EOT receiving the second information transmitted in parallel on the first and second wireless communication channels.

Clause 15: The method of any one of clauses 7-14, wherein the information comprises digital data that is modulated on each frequency band.

Clause 16: The method of any one of clauses 7-15, wherein each frequency band includes one of the following frequencies: a frequency between 450 MHz-500 MHz; 220 MHz; 160 MHz; or a cellular telephone frequency between 700 MHz and 2.7 GHz.

Clause 17: The method of any one of clauses 7-16, wherein frequency is a center frequency of the frequency band.

Clause 18: A method of communication between first and second controllers positioned in spaced relation along a length of a train, wherein each controller includes one or more processors, the method comprising: (a) forming between the first and second controllers, first and second wireless communication channels, the first wireless communication channel operating at a first frequency and the second wireless communication channel operating at a second, different frequency; (b) causing the first and second wireless communication channels to be in communication in parallel, whereupon the first and second controllers are in communication via both the first and second wireless communication channels; (c) following step (b), the first controller causing information to be transmitted in parallel on the first and second wireless communication channels to the second controller; (d) following step (c), the second controller receiving the information transmitted in parallel on first and second wireless communication channels in step (c); and (e) following step (d), causing the first and second wireless communication channels to be inactive, whereupon the first and second controllers are out of communication.

Clause 19: The method of clause 18, wherein: the first controller includes at least one first radio transceiver; the second controller includes at least one second radio transceiver; and step (e) includes the at least one first radio transceiver and the at least one second radio transceiver entering into a low power, stand-by or sleep mode, whereupon the first and second wireless communication channels are inactive.

Clause 20: The method of clause 18 or 19, wherein: step (b) includes, one of the first and second radio transceivers awakening from the low power, stand-by or sleep mode into its active, fully operational mode and initiating communication with the other of the first and second radio transceivers via at least one of the first and second wireless communication channels whereupon the other of the first and second radio transceivers awakes from its low power, stand-by or sleep mode into its active, fully operational mode, whereupon the first and second radio transceivers form the first and second wireless communication channels.

Clause 21: The method of any one of clauses 18-20, wherein: the first controller is one of a head-of-train (HOT) device positioned at or proximate a first end of a train or an end-of-train (EOT) device positioned at or proximate a second end of a train; and the second controller is the other of the HOT and EOT.

DESCRIPTION OF THE INVENTION

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

Figure 1:
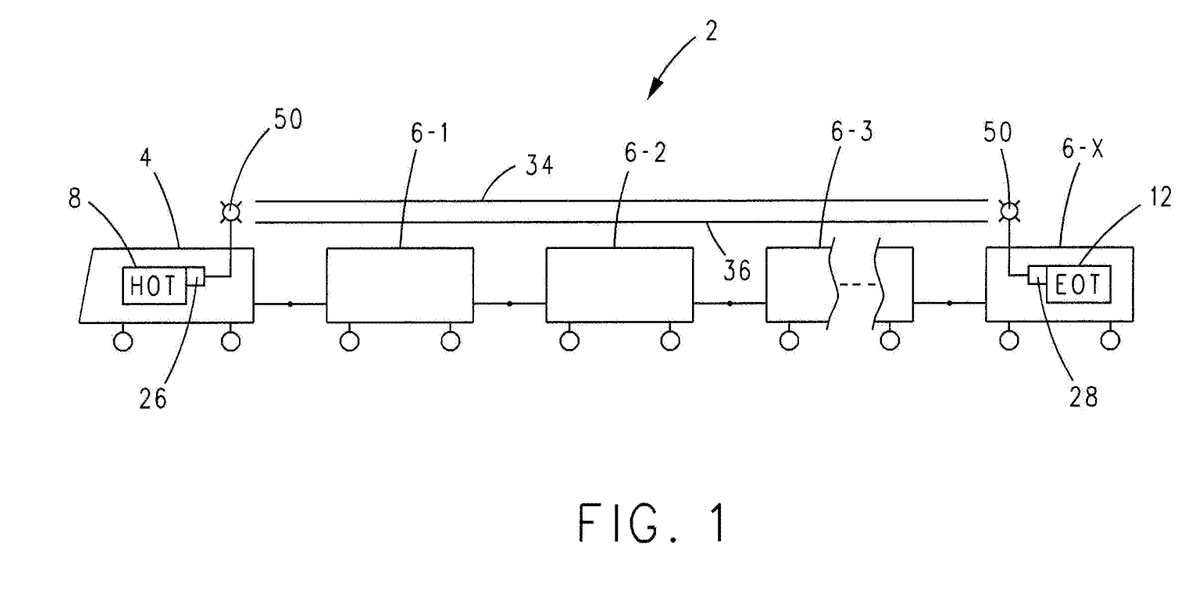
FIG. 1 is a schematic side-view of a train including a locomotive and a number of cars, showing non-limiting example locations of a head of train (HOT) unit and an end of train (EOT) unit in communication via multiple communication channels or links.

With reference to FIG. 1, in some non-limiting embodiments or examples, a train 2 can include a locomotive 4 and a number of cars 6-1-6-X, where "X" can be any whole number greater than or equal to 2. In the example train 2 shown in FIG. 1, locomotive 4 is the lead vehicle of the train and car 6-X is the last vehicle of train 2. However, this is not to be construed in a limiting sense since it is envisioned that the lead vehicle of train 2 can be a car 6 other than locomotive 4, e.g., locomotive 4 can be positioned in train 2 between the lead vehicle and the last vehicle. For the purposes of the following description, locomotive 4 will be the lead vehicle of train 2.

In some non-limiting embodiments or examples, train 2 can include a head-of-train (HOT) unit 8 disposed in locomotive 4 and an end of train (EOT) unit 12 disposed on or in car 6-X. In some non-limiting embodiments or examples, HOT 8 and EOT 12 can be used to control the brakes of locomotive 4 and car 6-1-6-X in a manner known in the art not disclosed here for the purpose of simplicity.

Figure 2:
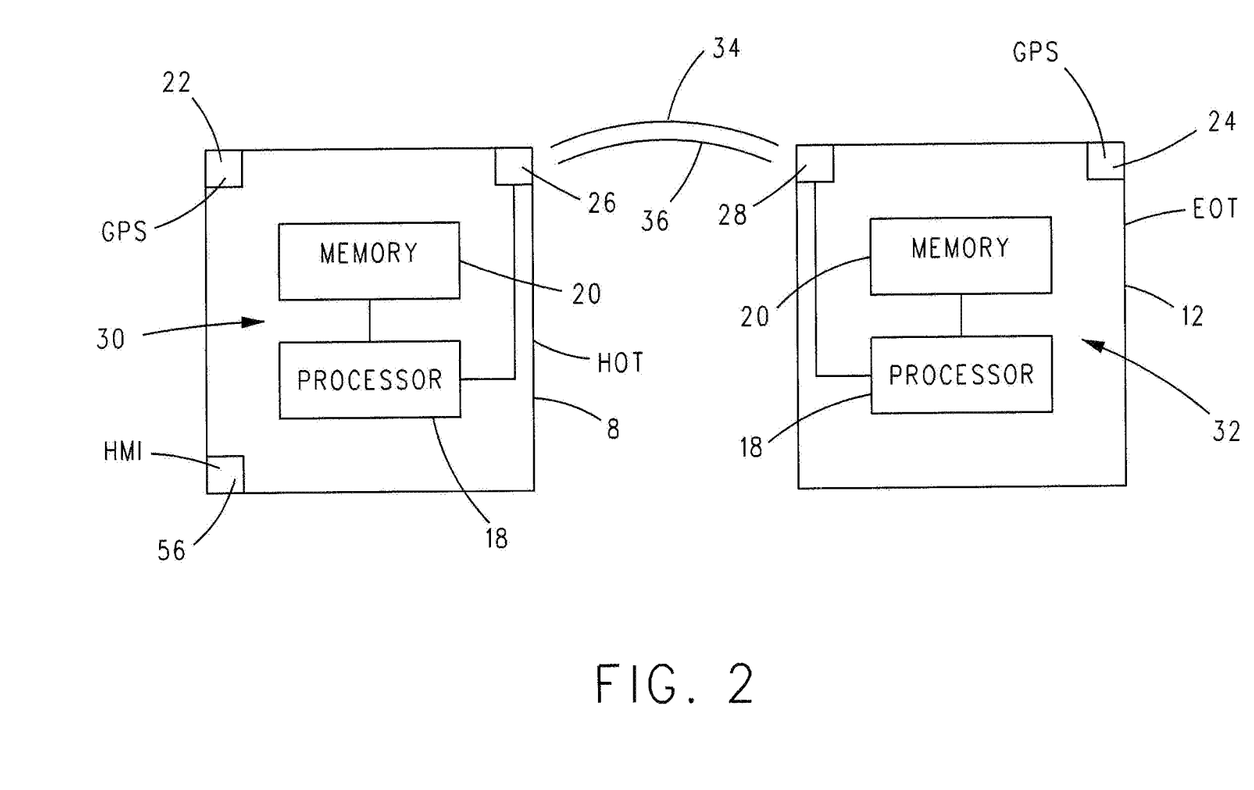
FIG. 2 is a diagrammatic illustration of the HOT, EOT, and multiple communication channels or links of FIG. 1.

In some non-limiting embodiments or examples, HOT 8 and EOT 12 can each include a processor 18 and a memory 20 coupled to processor 18 and operative for storing one or more software control programs and/or operational data. HOT 8 can include a wireless transceiver (or radio) 26 and EOT 12 can include a wireless transceiver (or radio) 28. EOT 12 may include a GPS receiver 24 and HOT 8 may also include an optional GPS receiver 22.

In some non-limiting embodiments or examples, processor 18 and memory 20 of HOT 8 can comprise a controller 30 while processor 18 and memory 20 of EOT 12 can comprise a controller 32. However, this particular configuration of each controller 30 and 32 is not to be construed in a limiting sense since it is envisioned that each controller can comprise two or more processors.

In some non-limiting embodiments or examples, wireless transceivers 26 and 28 can each be programmed or configured to provide a plurality of wireless communication channels therebetween, wherein each wireless communication channel operates at a different radio carrier frequency than each other wireless communication channel. In some non-limiting embodiments or examples, the plurality of wireless communication channels can include a first wireless communication channel 34 between wireless transceivers 26 and 28 and a second wireless communication channel 36 between wireless transceivers 26 and 28. In some non-limiting embodiments or examples, first and second wireless communication channels 34 and 36 can be operated in parallel, whereupon the same information or data can be transmitted in parallel over first and second wireless communication channels 34 and 36.

In some non-limiting embodiments or examples, each wireless transceiver 26 and 28 can be programmed or configured to be in a sleep state when not conveying information or data via first and second wireless communication channels 34 and 36. When it is desired to transmit information or data in parallel via first and second wireless communication channels 34 and 36, the processor 18 initiating the transmission can cause its corresponding wireless transceiver (26 or 28) to awake from its sleep state and begin transmitting the information or data via both wireless communication channels 34 and 36 in parallel to the other wireless transceiver (28 or 26). The other wireless transceiver (28 or 26) in its sleep state is programmed or configured to be responsive to information or data transmitted on first and/or second wireless communication channels 34 and/or 36 to awake from its sleep state to receive the information or data transmitted in parallel on the first and second wireless communication channels 34 and 36, to demodulate the information or data transmitted thereon, and to provide the same to the processor associated with the other wireless transceiver (28 or 26). For example, starting from the state where first and second radio transceivers 26 and 28 are each in a sleep state, in response to processor 18 of HOT 8 communicating information or data to wireless transceiver 26, wireless transceiver 26 awakes from its sleep state and begins transmitting said information or data over first and second wireless communication channels 34 and 36 in parallel. In some non-limiting embodiments or examples, in response to sensing information or data being transmitted at the first and second carrier frequencies 42 and 44 (FIG. 3) associated with first and second wireless communication channels 34 and 36, wireless transceiver 28 can awake from its sleep state and complete the formation of the first and second wireless communication channels 34 and 36. Thereafter, wireless transceiver 28 can receive the information or data transmitted on first and second wireless communication channels 34 and 36, demodulate said information or data, and forward said demodulated information or data to processor 18 of EOT 12 for processing in accordance with its programming.

Figure 3:
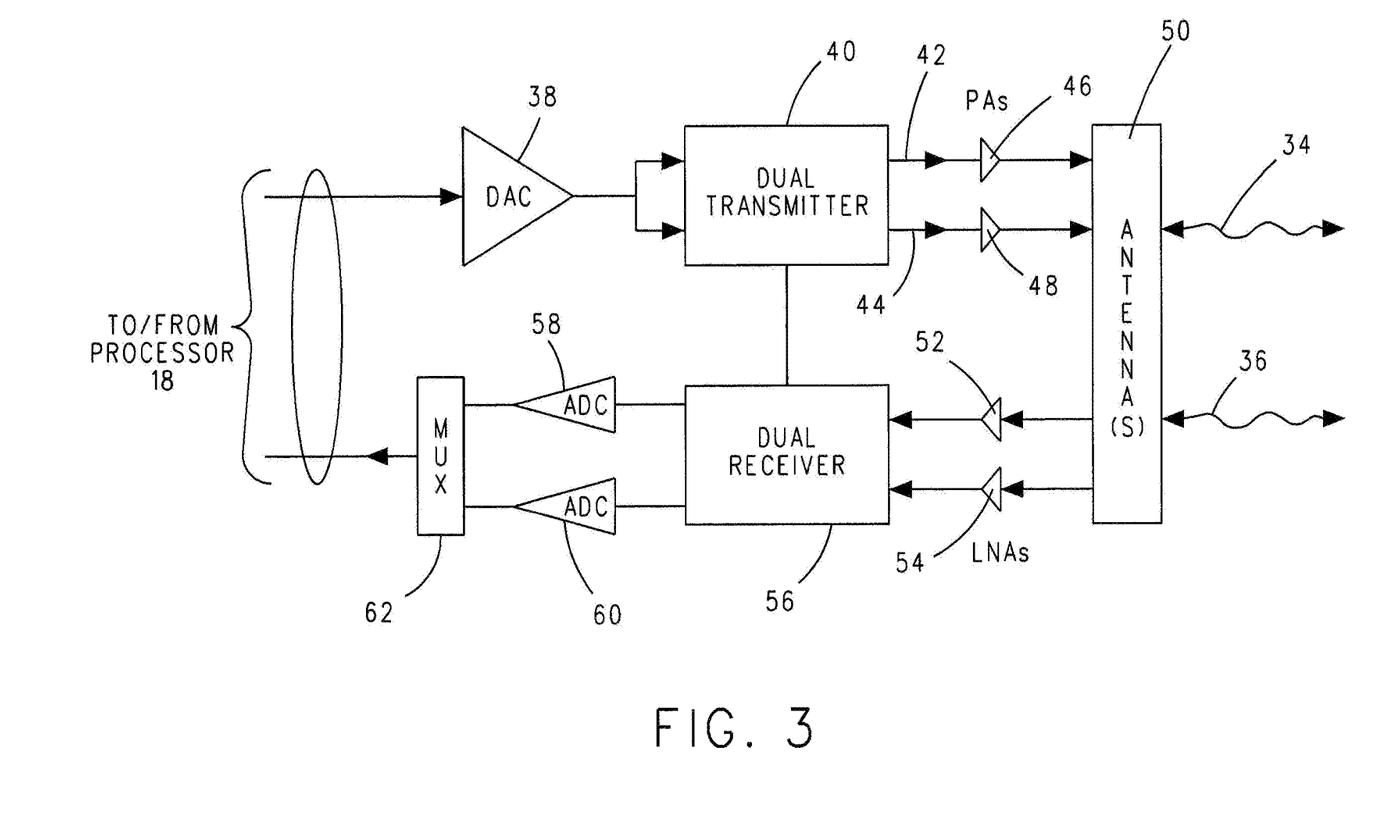
FIG. 3 is a diagrammatic illustration of one non-limiting embodiment or example wireless transceiver that can be utilized with each of the HOT and EOT shown in FIG. 1.

With reference to FIG. 3 and with continuing reference to FIGS. 1 and 2, each wireless transceiver 26 and 28 can include a digital-to-analog converter (DAC) which can convert digital data from the corresponding processor 18 into analog data which can be supplied to a dual transmitter 40. Dual transmitter 40 can modulate the analog signal received from DAC 38 onto the first and second radio carrier frequencies 42 and 44 which can be amplified by power amplifiers 46 and 48, respectively, and transmitted via one or more antennas 50.

In some non-limiting embodiments or examples, each wireless transceiver 26 and 28 can also include low noise amplifiers 52 and 54 for receiving and amplifying signals received via the one or more antennas 50 and for providing said amplified signals to a dual receiver 56. In some non-limiting embodiments or examples, dual receiver 56 can demodulate the signals received from low noise amplifiers 52 and 54 and provide the demodulated signals to analog-to-digital converters (ADC) 58 and 60. The digitized outputs of ADCs 58 and 60 can be provided to multiplexer 62 which, in turn, can provide said digitized outputs to the corresponding processor 18 for processing in accordance with its programming.

In some non-limiting embodiments or examples, data transmitted between HOT 8 to EOT 12 in parallel via first and second wireless communication channels 34 and 36 can include appended thereto data integrity information from which the integrity of the data being transmitted can be confirmed. Similarly, the information or data received by HOT 8 and EOT 12 can include, in addition to the transmitted information or data, the data integrity information. In some non-limiting embodiments or examples, information from which the data integrity can be determined can include at least one of the following: a checksum; a Bose-Chaudhuri-Hocquenghem (BCH) code; or a cyclic redundancy check (CRC).

In some non-limiting embodiments or examples, in response to receiving the plural (e.g., two) instances of information or data, including the data integrity information, from ADCs 58 and 60, and multiplexer 62, the corresponding processor 18, upon determining from the data integrity information that each instance of the information or data is valid or accurate, said processor 18 can further process either instance of said information or data in accordance with its programing. On the other hand, for example, if one instance of said information or data fails the data integrity check and is invalid, and the other instance of said information or data passes the data integrity check and is valid, the processor 18 can use the latter instance of said information or data in accordance with its programming.

The foregoing description of the elements comprising each wireless transceiver 26 and 28 is simply for the purpose of illustration and is not to be construed as limiting since it is envisioned that one or both of wireless transceivers 26 and 28 may be comprised of any other suitable and/or desirable elements that enable the transmission and receipt of information or data over first and second wireless communication channels 34 and 36.

Having described an example wireless transceiver for producing first and second wireless communication channels 34 and 36 in parallel, various methods of communication from HOT 8 to EOT 12, or vice versa, will now be described.

Figure 4:
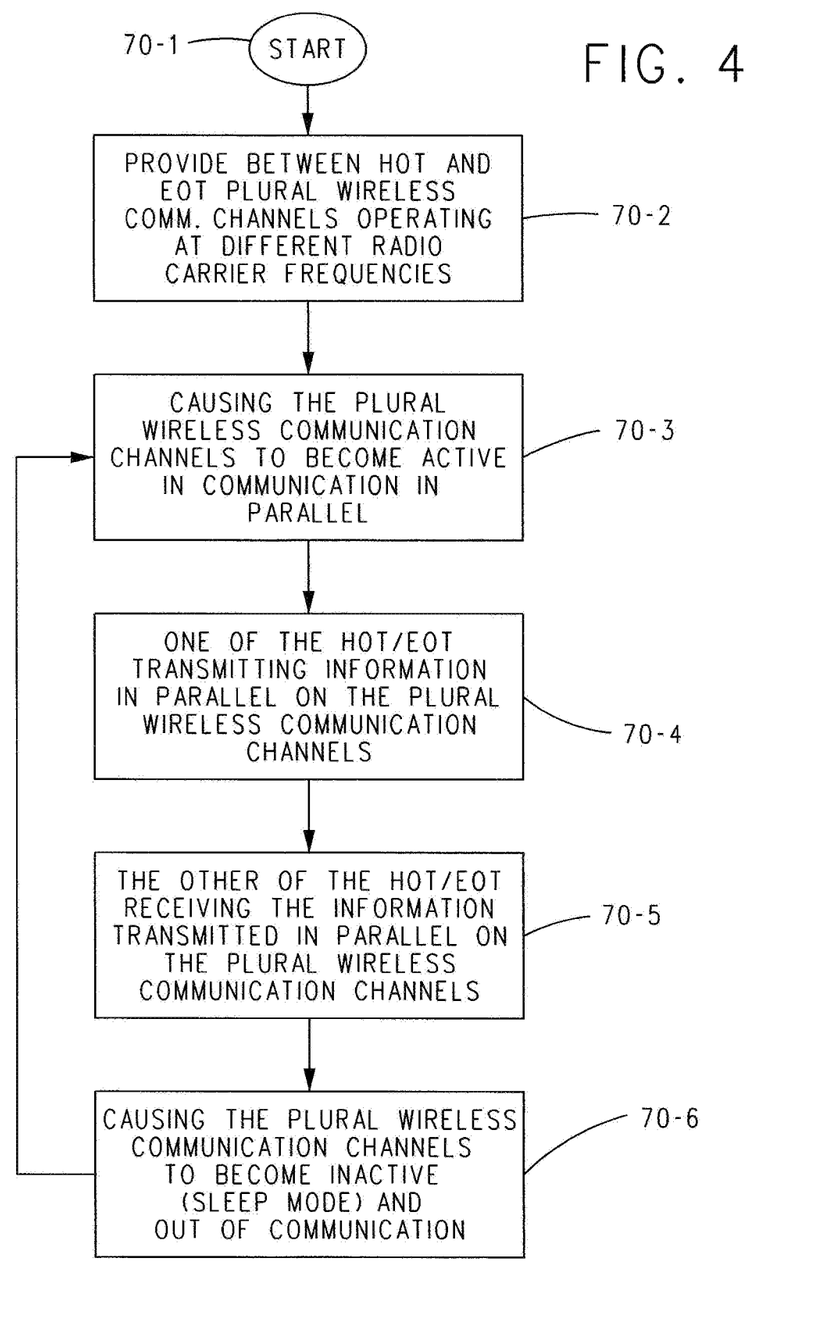
FIG. 4 is a flow diagram of a method in accordance with the principles of the present invention.

With reference to FIG. 4 and with continuing reference to all previous figures, one method of communication between HOT 8 and EOT 12 in accordance with the principles of the present invention will now be described.

In some non-limiting embodiments or examples, the method initially advances from a start step 70-1 to step 70-2 wherein plural wireless communication channels, e.g., 34 and 36, operating at different radio carrier frequencies are provided between HOT and EOT 12. In an example, step 70-2 can include, among other things, providing the necessary hardware, e.g., wireless transceivers 26 and 28, to enable the plural wireless communication channels, e.g., 34 and 36 to be established between HOT 8 and EOT 12. In some non-limiting embodiments or examples, in step 70-2 it is not necessary for the one or more of the plural wireless communication channels to be active.

The method can then advance to step 70-3 wherein the plural wireless communication channels are caused, e.g., via the controllers of HOT 8 and EOT 12, to become active in communication in parallel. In step 70-4, one of the HOT 8 or EOT 12 transmits information in parallel on the plural wireless communication channels. In step 70-5, the other of the HOT 8 and EOT 12 receives the information transmitted in parallel on the plural wireless communication channels in step 70-4.

In step 70-6, the plural wireless communication channels can then be caused to be inactive (sleep mode) and out of communication. In some non-limiting embodiments or examples, the plural wireless communication channels can be inactive in response wireless transceivers 26 and 28 entering a sleep mode, e.g., after a predetermined interval of time during which no information or data is being passed therebetween. This timing of entering sleep mode can be controlled by hardware (not shown) of each wireless transceiver 26 and 28 and/or the processor 18 coupled to each wireless transceiver.

Thereafter, step 70-3-70-6 may be repeated, e.g., intermittently, as needed when communication from HOT 8 to EOT 12, or vice a versa, is desired. The information or data transmitted in parallel on the plural wireless communication channels can comprise digital data that is modulated on each radio carrier frequency.

In an example, each communication channel can be operated at a radio carrier frequency of approximately 160 MHz, 220 MHz, or between 450 MHz-500 MHz. In an example, first wireless communication channel 34 may operate at 160 MHz while second wireless communication channel 36 may operate at 220 MHz. In an example, each wireless communication channel 34 and 36 operates at a different carrier frequency.

In some non-limiting embodiments or examples, at least one wireless communication channel 34 or 36 may comprise a cellular telephone infrastructure whereupon information or data communicated on said wireless communication channel is routed through said cellular telephone infrastructure (not specifically shown). In this example, instead of there being a direct communication between wireless transceivers 26 and 28, at least one wireless communication channel 34 or 36 can include information or data being transmitted via the cellular telephone infrastructure (network). In an example, cellular telephone frequencies can vary between 700 MHz and 2.7 GHz, depending on the country or region where train 2 may be operating.

In some non-limiting embodiments or examples, the choice of frequencies and, optionally, infrastructure used with each wireless communication channel 34 and 36 can be selected in any suitable and/or desirable manner to accomplish the aim of communicating information or data in parallel on first and second wireless communication channels 34 and 36. Accordingly the particular description of frequencies and/or infrastructure (e.g., a cellular telephone infrastructure) that may be used is not to be construed in a limiting sense.

Figure 5:
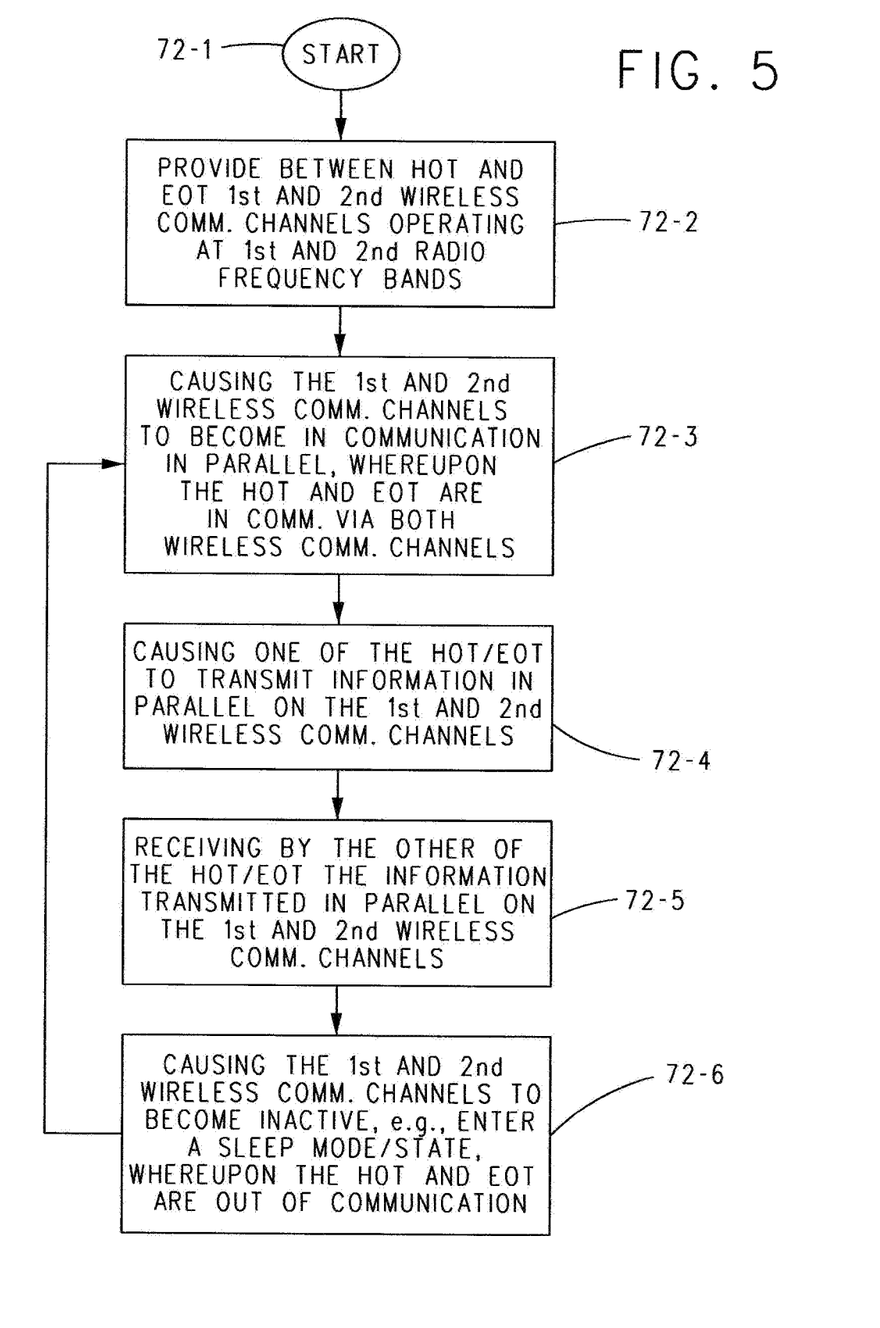
FIG. 5 is a flow diagram of a method in accordance with the principles of the present invention.

With reference to FIG. 5, in some non-limiting embodiments or examples, in another method of communication between HOT 8 positioned on, at, or proximate a first end of train 2 and EOT 12 positioned on, at, or proximate a second end of train 2 can include advancing from start step 72-1 to step 72-2. In step 72-2, first and second wireless communication channels 34 and 36 operating at first and second radio frequency bands are provided between HOT 8 and EOT 12. As discussed above, it is envisioned that this step can comprise providing the necessary hardware and/or software need to establish the first and second wireless communication channels 34 and 36.

The method can then advance to step 72-3 wherein the first and second wireless communication channels 34 and 36 are caused to be in communication in parallel, whereupon the HOT 8 and EOT 12 are in communication in parallel via both the first and second wireless communication channels 34 and 36.

The method can then advance to step 72-4 wherein one of the HOT 8 or EOT 12 causes information or data to be transmitted in parallel on the first and second wireless communication channels 34 and 36.

Next, in step 72-5, the other of the HOT 8 and EOT 12 receives the information or data transmitted in parallel on the first and second wireless communication channels 34 and 36. The method then advances to step 72-6 wherein the first and second wireless communication channels are caused to be inactive, e.g., enter into a sleep mode/state, whereupon HOT 8 and EOT 12 are out of communication.

In some non-limiting embodiments or examples, steps 72-3-72-6 can be repeated, e.g., intermittently, as deemed suitable and/or desirable to transmit information or data from HOT 8 to EOT 12, or vice versa.

In some non-limiting embodiments or examples, one or more instances of step 72-3 can include one of the wireless transceivers 26 or 28 awakening from its low power, stand-by, or sleep mode into its active, fully operational mode and initiating communication with the other wireless transceiver 28 or 26 via carrier frequency associated with at least one of the first and second wireless communication channels 34 and 36. In response, the other wireless transceiver can awake from its low power, stand-by, or sleep mode to its active, fully operational mode, whereupon the wireless transceivers 26 and 28 can form the first and second wireless communication channels 34 and 36.

In some non-limiting embodiments or examples, when it is desired to transmit data from EOT 12 to HOT 8, processor 18 of EOT 12 causes wireless transceiver 28 to awaken from its low power, stand-by, or sleep mode into a fully operational mode to initiate communication with wireless transceiver 26 which can be in its low power, stand-by, or sleep mode. In an example, while wireless transceiver 26 is in its low power, stand-by or sleep mode, wireless transceiver 26 can be programmed or configured to respond to communications from wireless transceiver 28 and awaken from its low power, stand-by, or sleep mode into its active, fully operational mode. Once wireless transceivers 26 and 28 have awakened from their respect low power, stand-by, or sleep modes into their respective active, fully operational modes, first and second wireless communication channels 34 and 36 can be formed in parallel between wireless transceivers 26 and 28.

In some non-limiting embodiments or examples, as discussed above, each transmission of information or data in parallel on first and second wireless communication channels 34 and 36 can include data integrity information. In an example, this data integrity information can include a checksum of the information or data transmitted. In response to receiving each instance of information transmitted in parallel on the first and second wireless communication channels 34 and 36, a first checksum of the information or data transmitted on wireless communication channel 34 and a second checksum of information or data transmitted on wireless communication channel 36 can be calculated by the processor 18 associated with the receiving wireless transceiver and compared to a reference checksum comprising the data integrity information included with the transmitted information or data.

The first checksum can be compared to the reference checksum to determine if the information or data transmitted on first wireless communication channel 34 is valid. Similarly, the second checksum can be compared to the reference checksum to determine if the information or data transmitted on second wireless communication channel 36 is valid. In an example, provided the information or data transmitted via least one wireless communication channel 34 and 36 is valid, said information or data can be utilized by the corresponding processor 18 in accordance with its programming. Moreover, the processor 18 associated with the wireless transceiver receiving the information or data can utilize the calculated first and second checksums as a confirmation of the integrity of said information or data. In an example, if the calculated first and second checksums are the same and each calculated checksum is the same as the reference checksum included with the transmitted information or data, the processor 18 associated with the wireless transceiver receiving said information or data is assured of the integrity of said data, whereupon said processor can store or respond to said information or data in accordance with its programming.

In some non-limiting embodiments or examples, if the processor 18 associated with the wireless transceiver receiving the information or data transmitted in parallel on the first and second wireless communication channels 34 and 36 determines that, for example, the first checksum is not equal to the reference checksum and the second checksum is equal to said reference checksum, the processor 18 can store or respond to said information transmitted only on the second wireless communication channel, ignoring the information or data transmitted on the first wireless communication channel.

In some non-limiting embodiments or examples, each response to information or data transmitted on a wireless channel can include the processor 18 associated with the wireless transceiver (e.g., 26 or 28) receiving the transmitted information or data transmitting second information or data in parallel on the first and second wireless communication channels 34 and 36. The second information transmitted in parallel on the first and second wireless communication channels 34 and 36 can be received by the other wireless transceiver (e.g., 28 or 26).

In an example, assume EOT 12 transmits information or data on first and second wireless communication channels 34 and 36 to HOT 8. In response, processor 18 of HOT 8 may transmit second information or data in parallel on first and second wireless communication channel 34 and 36 to EOT 12. In this example, the second information or data may include an acknowledgement by HOT 8 that it has received the information or data transmitted by EOT 12. However, this is not to be construed in a limiting sense. In some non-limiting embodiments or examples, the information or data transmitted in parallel on first and second wireless communication channels 34 and 36 can be digital data that is modulated on the respective first and second carrier frequencies or frequency bands of the first and second communication channels 34 and 36.

In some non-limiting embodiments or examples, each frequency band can include at least one of the following frequencies: a frequency between 450 MHz-500 MHz; 220 MHz; 160 MHz; or a cellular telephone frequency between 700 MHz and 2.7 GHz. In an example, each frequency may be a center frequency of a corresponding frequency band.

Figure 6:
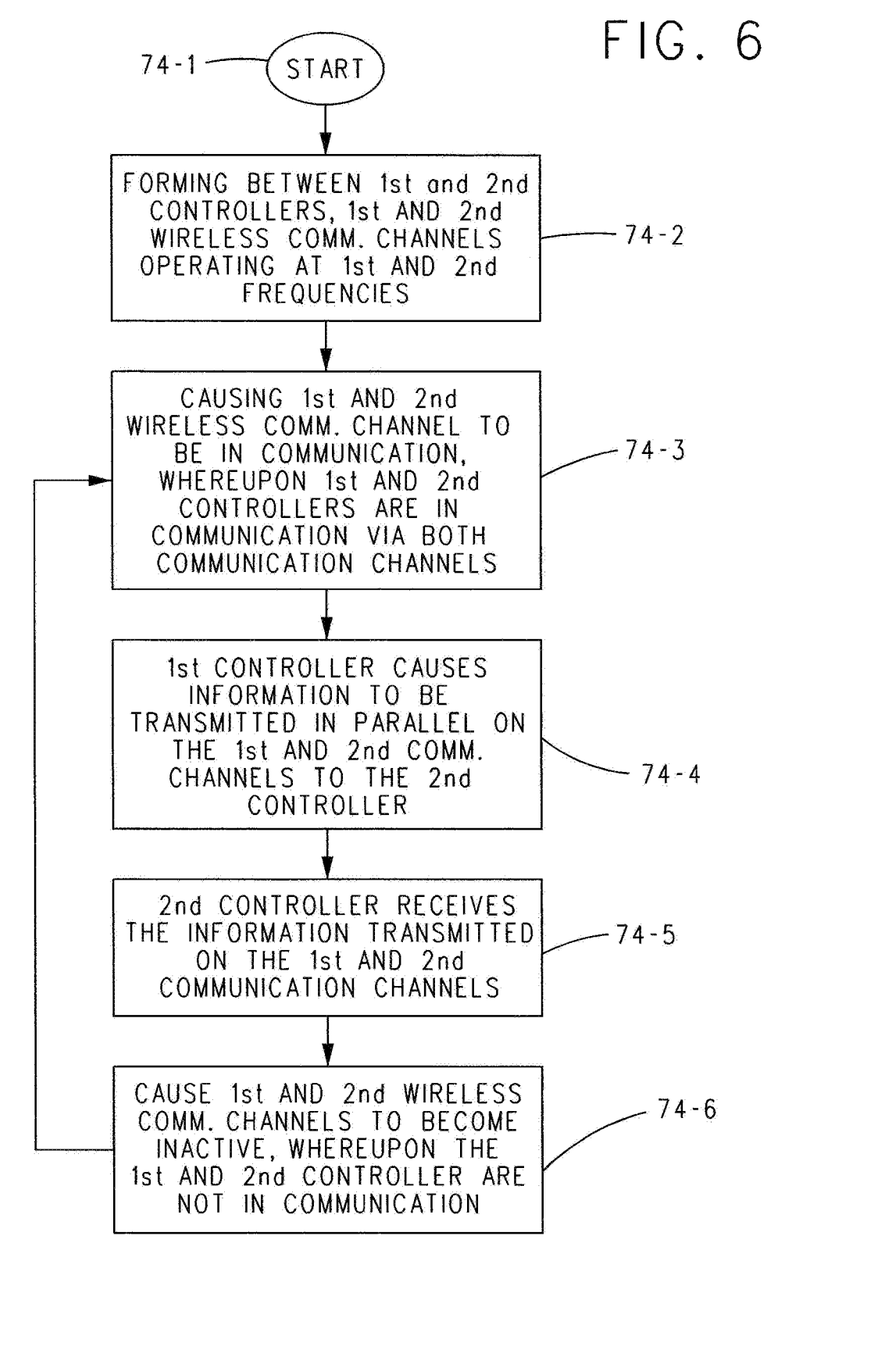
FIG. 6 is a flow diagram of a method in accordance with the principles of the present invention.

With reference to FIG. 6 and with continuing reference to all previous figures, in some non-limiting embodiments or examples, in another method of communicating between first and second controllers 30 and 32 positioned in spaced relation along the length of the train, wherein each controller includes one or more processors 18, the method can include advancing from start step 74-1 to step 74-2. In step 74-2, first and second wireless communication channels operating at first and second frequencies can be formed between first and second controllers 30 and 32. In some non-limiting embodiments or examples, step 74-2 can include, among other things, wireless transceivers 26 and 28 being able to communicate with each other via first and second wireless communication channels 34 and 36.

The method can then advance to step 74-3 wherein the first and second wireless communication channel 34 and 36 are caused to be in communication in parallel, whereupon first and second controllers 30 and 32 are in communication via both the first and second wireless communication channels 34 and 36. In step 74-4, the first controller can cause information or data to be transmitted in parallel on the first and second wireless communication channels 34 and 36 to the second controller.

In some non-limiting embodiments or examples, the method can then advance to step 74-5 wherein the second controller can receive the information transmitted in parallel on the first and second wireless communication channels 34 and 36 in step 74-4. Finally, the method can then advance to step 74-6 wherein the first and second wireless communication channels can be caused to be inactive (set to a sleep mode), where the first and second controllers are not in communication. Thereafter, the method can repeat steps 74-3-74-6 as needed, e.g., intermittently.

In some non-limiting embodiments or examples, step 74-3 can include one of the wireless transceivers 26 or 28 awakening from a low power, stand-by, or sleep mode into its active, fully operational mode and initiating communication with the other wireless transceiver via at least one of the first and second wireless communication channels 34 and 36. In response to this communication, the other wireless transceiver can awaken from its low power, stand-by, or sleep mode into its active, fully operational mode, whereupon the wireless transceivers 26 and 28 can form first and second wireless communication channels 34 and 36 in parallel.

Finally, the first controller can be controller 30 or 32 while the second controller can be the other of controller of 30 or 32. However, this is not to be construed in a limiting sense.

As can be seen, disclosed herein are methods of communicating between first and second controllers which can comprise HOT 8 and EOT 12. The various methods described herein utilize first and second communication channels formed in parallel between the first and second controllers in parallel for communicating the same data between said first and second controllers. By providing first and second communication channels between the first and second controllers, a drawback associated with utilizing only a single channel for communication, namely, the communication channel becoming disrupted whereupon there is no communication between the first and second controllers for, possibility, an extended period of time due to, for example, challenging environmental conditions.

In the present invention, the use of multiple communication channels simultaneously improves the likelihood that the first and second controllers will be able to communicate information when needed especially for the safe operation of a train.

For example, for trains equipped with a pressurized brake pipe, it can be desirable to release the pressure in the brake pipe (thereby activating the brakes) from both ends of the train. This typically is accomplished by HOT 8 transmitting to EOT 12 a command to vent the brake pipe to atmosphere thereby causing the brakes to become applied. The use of two or more communication channels in accordance with the principles of the present invention verses a single communication channel in accordance with the teachings of the prior art, improves the likelihood that HOT 8 will be able to communicate a brake command to EOT 12, especially when emergency braking is needed.

Although the invention has been described in detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect.

The invention claimed is:

1. A method comprising:
   providing, between a first wireless transceiver and a second wireless transceiver onboard different vehicles, plural wireless communication channels, each of the plural wireless communication channels operating at a different radio carrier frequency;
   causing the plural wireless communication channels to be active and in communication in parallel;
   transmitting, by the first wireless transceiver, the same information in parallel on the plural wireless communication channels;
   receiving, by the second wireless transceiver, the same information transmitted in parallel on the plural wireless communication channels; and
   causing the plural wireless communication channels to be inactive and out of communication.

2. The method of claim 1, further
   comprising repeating causing the plural wireless communication channels to be active and in communication in parallel, transmitting the same information in parallel on the plural wireless communication channels, receiving the same information transmitted in parallel on the plural wireless communication channels, and causing the plural wireless communication channels to be inactive and out of communication.

3. The method of claim 1, further including
   comprising repeating causing the plural wireless communication channels to be active and in communication in parallel, transmitting the same information in parallel on the plural wireless communication channels, receiving the same information transmitted in parallel on the plural wireless communication channels, and causing the plural wireless communication channels to be inactive and out of communication steps intermittently.

4. The method of claim 1, further comprising:
   determining, by the second wireless transceiver, data integrity of the information transmitted on each of the plural wireless communication channels; and
   in response to determining that the data integrity for the plural wireless communication channels is the same, the second wireless transceiver storing or responding to the information.

5. The method of claim 4, wherein determining the data integrity includes determining one or more of:
   a Bose-Chaudhuri-Hocquenghem (BCH) code; or
   a cyclic redundancy check (CRC).

6. The method of claim 1, where the information comprises digital data that is modulated on each of the radio carrier frequencies.

7. A method of comprising:
   providing, between a first wireless transceiver onboard a first vehicle and a second wireless transceiver onboard a second vehicle, first and second wireless communication channels, the first wireless communication channel operating at a first frequency band and the second wireless communication channel operating at a second, different frequency band;
   causing the first and second wireless communication channels to be in communication in parallel, whereupon the first wireless transceiver and the second wireless transceiver are in communication via both the first and second wireless communication channels;
   causing, by the first wireless transceiver, the same information to be transmitted in parallel on the first and second wireless communication channels;
   receiving, by the second wireless transceiver, the same information transmitted in parallel on the first and second wireless communication channels; and
   causing the first and second wireless communication channels to be inactive, whereupon the first wireless transceiver and the second wireless transceiver are out of communication.

8. The method of claim 7, wherein:
   the first wireless transceiver includes at least a first radio transceiver;
   the second wireless transceiver includes at least one second radio transceiver; and
   causing the first and second wireless communication channels to be inactive includes the at least a first radio transceiver and the at least a second radio transceiver entering into a low power, stand-by or sleep mode, whereupon the first and second wireless communication channels are inactive.

9. The method of claim 8, wherein:
   receiving, by the second wireless transceiver, the same information transmitted in parallel on the first and second wireless communication channels includes, the at least a first radio transceiver awakening from the low power, stand-by or sleep mode into an active, fully operational mode and initiating communication with the other of the EOT and HOT at least a second radio transceiver via at least one of the first wireless communication channel or the second wireless communication channel, whereupon the at least a second radio transceiver awakes from the low power, stand-by or sleep mode into the active, fully operational mode, whereupon the first and second radio transceivers form the first and second wireless communication channels.

10. The method of claim 7, further
   comprising repeating causing the first and second wireless communication channels to be in communication in parallel; causing the same information to be transmitted in parallel on the first and second wireless communication channels; receiving the same information transmitted in parallel on the first and second wireless communication channels; and causing the first and second wireless communication channels to be inactive.

11. The method of claim 7, further comprising repeating causing the first and second wireless communication channels to be in communication in parallel; causing the same information to be transmitted in parallel on the first and second wireless communication channels; receiving the same information transmitted in parallel on the first and second wireless communication channels; and causing the first and second wireless communication channels to be inactive intermittently.

12. The method of claim 7, further comprising:
determining a first checksum of the information transmitted on the first wireless communication channel and a second checksum of the information transmitted on the second wireless communication channel; and
in response to determining that the first and second checksums are the same, storing or responding to the information.

13. The method of claim 12, wherein the same information transmitted in parallel on the first and second wireless communication channels is first information, wherein responding to the first information includes:
the second wireless transceiver transmitting the same second information in parallel on the first and second wireless communication channels; and
the first wireless transceiver receiving the same second information transmitted in parallel on the first and second wireless communication channels.

14. The method of claim 7, further comprising:
determining a first checksum of the information transmitted on the first wireless communication channel and a second checksum of the information transmitted on the second wireless communication channel; and
in response to determining (1) the first checksum is not equal to a reference checksum included in the same information transmitted on the first and second wireless communication channels and (2) the second checksum is equal to the reference checksum, storing or responding only to the information transmitted on the second wireless communication channel.

15. The method of claim 7, wherein the information comprises digital data that is modulated on each of the first and second frequency bands.

16. The method of claim 7, wherein each of the first and second frequency bands includes one of the following frequencies:
a frequency between 450 MHz-500 MHz;
220 MHz; or
160 MHz.

17. A method comprising:
forming first and second wireless communication channels between first and second controllers, the first wireless communication channel operating at a first frequency and the second wireless communication channel operating at a different, second frequency;
causing the first and second wireless communication channels to be in communication in parallel, whereupon the first and second controllers are in communication via both the first and second wireless communication channels;
transmitting information from the first controller in parallel on the first and second wireless communication channels to the second controller;
receiving the information transmitted in parallel on first and second wireless communication channels at the second controller; and
causing the first and second wireless communication channels to be inactive, whereupon the first and second controllers are out of communication.

18. The method of claim 17, wherein
causing the first and second wireless communication channels to be inactive includes a first radio transceiver of the first controller and a second radio transceiver of the second controller entering into a low power, stand-by or sleep mode, whereupon the first and second wireless communication channels are inactive.

19. The method of claim 18, wherein:
causing the first and second wireless communication channels to be in communication in parallel includes, the first radio transceiver awakening from the low power, stand-by or sleep mode into an active, fully operational mode and initiating communication with the second radio transceiver via at least one of the first wireless communication channel and the second wireless communication channel, whereupon the second radio transceiver awakes from the low power, stand-by or sleep mode into the active, fully operational mode, whereupon the first and second radio transceivers form the first and second wireless communication channels.

20. The method of claim 17, wherein:
the first controller is a head-of-train (HOT) device positioned at or proximate a first end of a train; and
the second controller is an end-of-train (EOT) device positioned at or proximate a second end of a train.

* * * * *